US007284602B2

(12) United States Patent
Tessier et al.

(10) Patent No.: US 7,284,602 B2
(45) Date of Patent: Oct. 23, 2007

(54) SELF-ALIGNING STUFFING BOX (75) Inventors: Lynn P. Tessier, Cochrane (CA); John P. Doyle, Calgary (CA); James L. Weber, Calgary (CA)

(73) Assignee: MSI Machineering Solutions, Inc., Providenciales (TC)

( * ) Notice: Subject to any disclaimer, the term of this patent is extended or adjusted under 35 U.S.C. 154(b) by 179 days.

(21) Appl. No.: 11/144,395

(22) Filed: Jun. 3, 2005

(65) Prior Publication Data

US 2006/0272804 A1 Dec. 7, 2006

(51) Int. Cl.
*E21B 19/00* (2006.01)

(52) U.S. Cl. .................... 166/84.1; 166/80.1
(58) Field of Classification Search ........... 166/84.1, 166/84.2, 80.1; 285/281, 275, 272
See application file for complete search history.

(56) References Cited

U.S. PATENT DOCUMENTS

| 2,036,537 | A | * | 4/1936 | Otis ........................... 277/326 |
| 3,887,196 | A | | 6/1975 | Renfrow |
| 5,141,052 | A | * | 8/1992 | Bump ........................ 166/80.1 |
| 5,429,188 | A | | 7/1995 | Cameron et al. |
| 5,540,281 | A | | 7/1996 | Round |
| 5,711,533 | A | | 1/1998 | Angelo et al. |
| 6,374,914 | B1 | | 4/2002 | Wong et al. |
| 6,412,783 | B1 | | 7/2002 | Finnestad |
| 6,843,313 | B2 | | 1/2005 | Hult |
| 6,866,245 | B2 | | 3/2005 | Deaton |

FOREIGN PATENT DOCUMENTS

| CA | 1290242 | 10/1991 |
| CA | 2283978 | 3/2001 |

* cited by examiner

*Primary Examiner*—David Bagnell
*Assistant Examiner*—Giovanna M Collins
(74) *Attorney, Agent, or Firm*—Sheridan Ross P.C.

(57) ABSTRACT

A self-aligning stuffing box having a spherical joint between the upper and lower portions of the housing permits universal movement of the upper portion relative to the lower portion to permit a rod to pass through the bore if the axis of the rod is misaligned relative to the axis of the bore in each of the upper and lower housing portions. An energized seal in the upper housing resides at or below the spherical joint due to a downwardly depending central portion of the upper housing which extends into a recess formed in the lower housing permitting the height of the stuffing box to be relatively short. A second seal is positioned above the first seal and may be spaced sufficiently above the first seal to permit a flapper valve to be installed between the seals. The flapper valve is mounted through a port in the upper housing which is accessible without disassembly of the stuffing box, the seals or the wellhead.

19 Claims, 10 Drawing Sheets

SELF-ALIGNING STUFFING BOX

FIELD OF THE INVENTION

Embodiments of the invention relate to wellhead assemblies and particularly to self-aligning stuffing boxes for a wellhead.

BACKGROUND OF THE INVENTION

Conventionally beam pumps, or rod pumps, commonly known as pumpjacks, reciprocate a polished rod extending axially through a stuffing box which contains packing to seal against the polished rod. Further, rotary pumps rotate a rod within the stuffing box. In each case, the seal prevents wellbore fluids from leaking from the wellhead during movement of the rod. If the rod is not axially aligned within the bore of the stuffing box, excessive wear of both the packing and the rod can occur. In extreme cases of wear the rod can fail and drop into the wellbore, leaving the wellbore open to the surface. Misalignment may occur for many reasons such as resulting from settling of the pumpjack or rotary drive on a base or due to misalignment of the wellhead or stuffing box during assembly thereof.

Conventionally, it is known to provide a self-aligning stuffing box to assist in preventing polished rod failure. U.S. Pat. No. 3,887,196 to Renfrow, U.S. Pat. No. 4,889,184 to Lugtmeier and U.S. Pat. No. 6,412,783 to Finnestad all teach self-aligning stuffing boxes incorporating embodiments of a first tubular member having a convex face for engaging a concave seat on a second tubular member forming an alignment aspect therebetween, permitting limited universal movement of the first and second members relative to one another for aligning of the polished rod therein while maintaining sealing of the packing about the polished rod. In each of these examples, the alignment aspect is positioned significantly below the packing in the stuffing box, necessitating a relatively tall stuffing box. Height of the wellhead may become problematic if insufficient bridle clearance is available between a pumpjack bridle and the wellhead, resulting in a shortened and less effective pumping stroke.

In the case of rod failure, many stuffing boxes are provided with a valve for sealing off the wellbore in the event of catastrophic failure of the rod. Typically, a valve, such as a flapper valve, is pivotally mounted in the bore of the stuffing box and is biased outwardly to engage the rod, such that if the rod drops into the wellbore, the valve is freed to rotate and seal the bore.

As is the case in U.S. Pat. No. 6,412,783 to Finnestad, many valves are positioned below the packing elements in the stuffing box and therefore, in order to replace or service the valves, the wellhead and stuffing box must be disassembled which is costly and time-consuming.

Others such as U.S. Pat. No. 4,889,184 to Lugtmeier have attempted to resolve the problems associated with positioning the valve lower in the stuffing box by positioning the valve adjacent the top of the stuffing box necessitating additional height to the stuffing box to incorporate the valve thereabove.

Ideally, what is required is a stuffing box capable of self-alignment for preventing undue wear of the packing and the rod moving therein that has a lower profile for maximizing the space between the wellhead or stuffing box and the pumpjack bridle in the case of a reciprocating pump or a rotary drive and the stuffing box in the case of a rotary pump. Further, it would be ideal to equip the shortened stuffing box with a valve for sealing the wellbore in the event catastrophic failure of the rod occurs.

SUMMARY OF THE INVENTION

A relatively low profile self-aligning stuffing box has a spherical joint formed between and upper tubular housing and a lower tubular housing for permitting misalignment of the upper housing relative to the lower housing for passage of a rod therethrough preventing lateral loading of the stuffing box. A first seal is housed in a bore in the upper tubular housing in a downwardly depending central cylindrical portion of the lower end of the upper tubular housing formed within a concave spherical face which forms an upper surface of the spherical joint. The downwardly depending central portion of the upper housing protrudes into a recess formed in the upper end of the lower tubular housing at a center of a convex spherical surface forming a lower surface of the spherical joint. Positioning of the first seal, at or below the spherical joint, permits the height of the upper tubular housing to be reduced. A second seal is positioned above the first seal in the bore of the upper housing.

In an alternate embodiment of the invention, a valve such as a flapper valve is pivotally mounted in the bore of the upper housing between the seals. The seals are spaced sufficient to accommodate the valve. In a preferred embodiment, the addition of the valve does not increase the height of the stuffing box significantly and preferably only about 2 inches. The valve is pivotally mounted to a mounting plate which is fastened to the housing at a port extending through a side wall of the upper housing. Preferably, the mounting plate is fastened to the housing using U-bolts and nuts and is readily removed to permit access to the valve without disassembly of the stuffing box, the seals or the wellhead.

Therefore, in a broad aspect of the invention a self-aligning stuffing box for a rod comprises: an upper tubular housing having a bore formed therethrough adapted for accepting the rod passing therethough along an axis, the bore having a first axis; a lower tubular housing having a bore formed therethrough adapted for accepting the rod passing therethrough, the bore having a second axis; a spherical joint between the upper tubular housing and the lower tubular housing having an upwardly recessed, substantially concave circumferential groove, having an outer spherical surface, formed about a lower end of the upper tubular housing and defining a central, downwardly depending portion therein; and an upwardly extending substantially convex spherical surface formed at an upper end of the lower tubular housing having a central recess formed therein for accepting the downwardly depending central portion of the upper tubular housing and permitting retained engagement of the concave and convex spherical surfaces for sealed universal movement therebetween for misaligning the first axis from the second axis and adapted for aligning the first axis relative to the rod axis; and at least a first sealing means, the first sealing means being housed within the bore of the downwardly depending central portion of the upper tubular housing and adapted for sealing about the rod.

Preferably, the seals are stacked circumferential chevron seals, energized using biasing means such as a wave spring. The seals are retained in the bore by retainers and are compressed against shoulders formed within the bore of the upper housing for forcing the seals laterally outward to engage the rod passing therethrough.

DETAILED DESCRIPTION OF THE PREFERRED EMBODIMENT

Figure 1A:
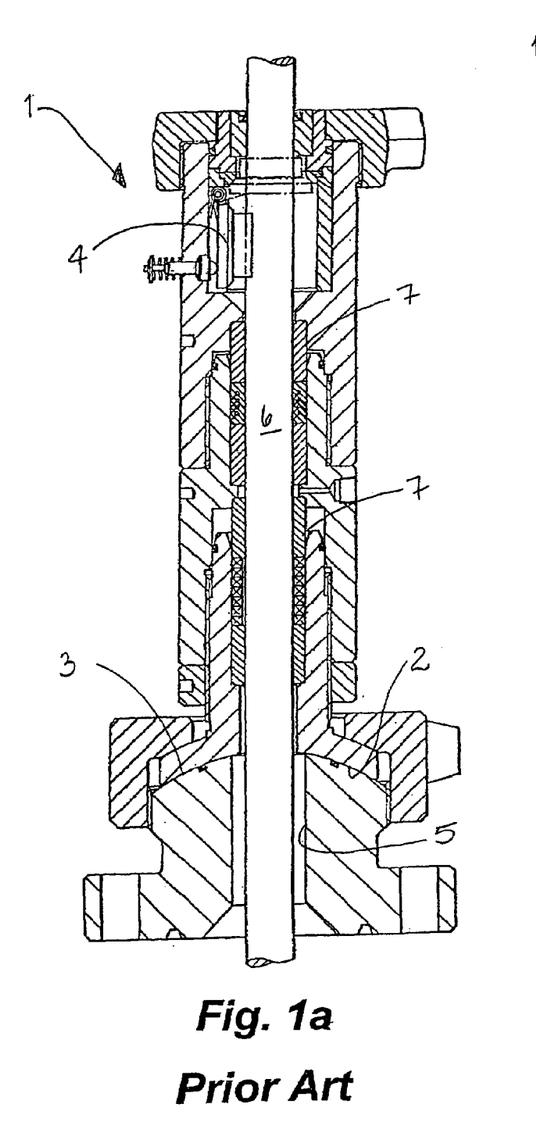
FIGS. 1a and 1b are longitudinal sectional views of prior art stuffing boxes, the stuffing boxes having relatively high profiles.
Figure 1B:
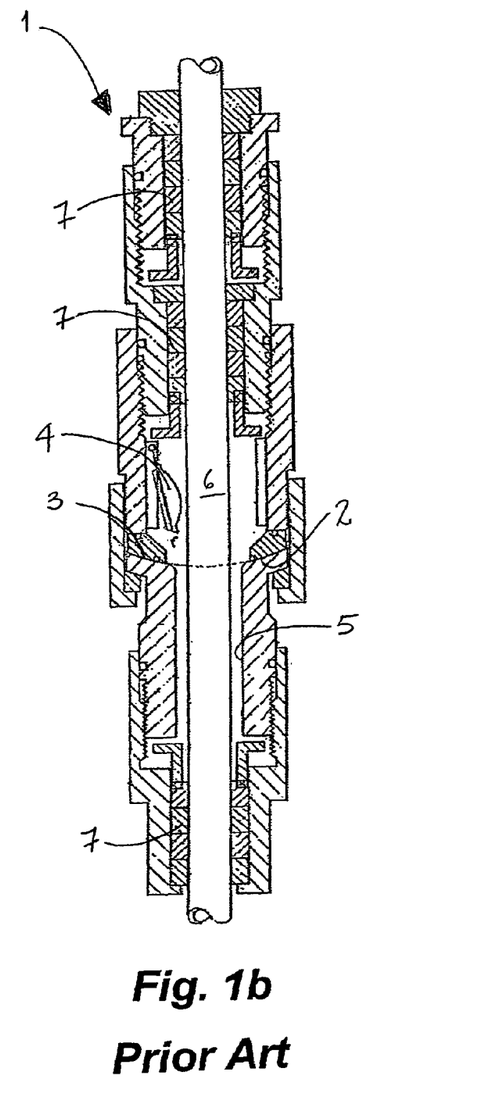

Having reference to FIGS. 1a and 1b, prior art self-aligning stuffing boxes 1 typically have a relatively high profile due to positioning of the components housed within the stuffing boxes 1 significantly above the alignment surfaces 2,3. Further, valve means 4 pivotally mounted within a bore 5 of the stuffing box 1 for sealing the bore 5 in the absence of a rod 6 are conventionally mounted either above or below sealing means 7 housed within the bore 5. Access to the valve means 4 for servicing or replacement is typically through disassembly of at least a portion of the stuffing box 1.

Figure 2:
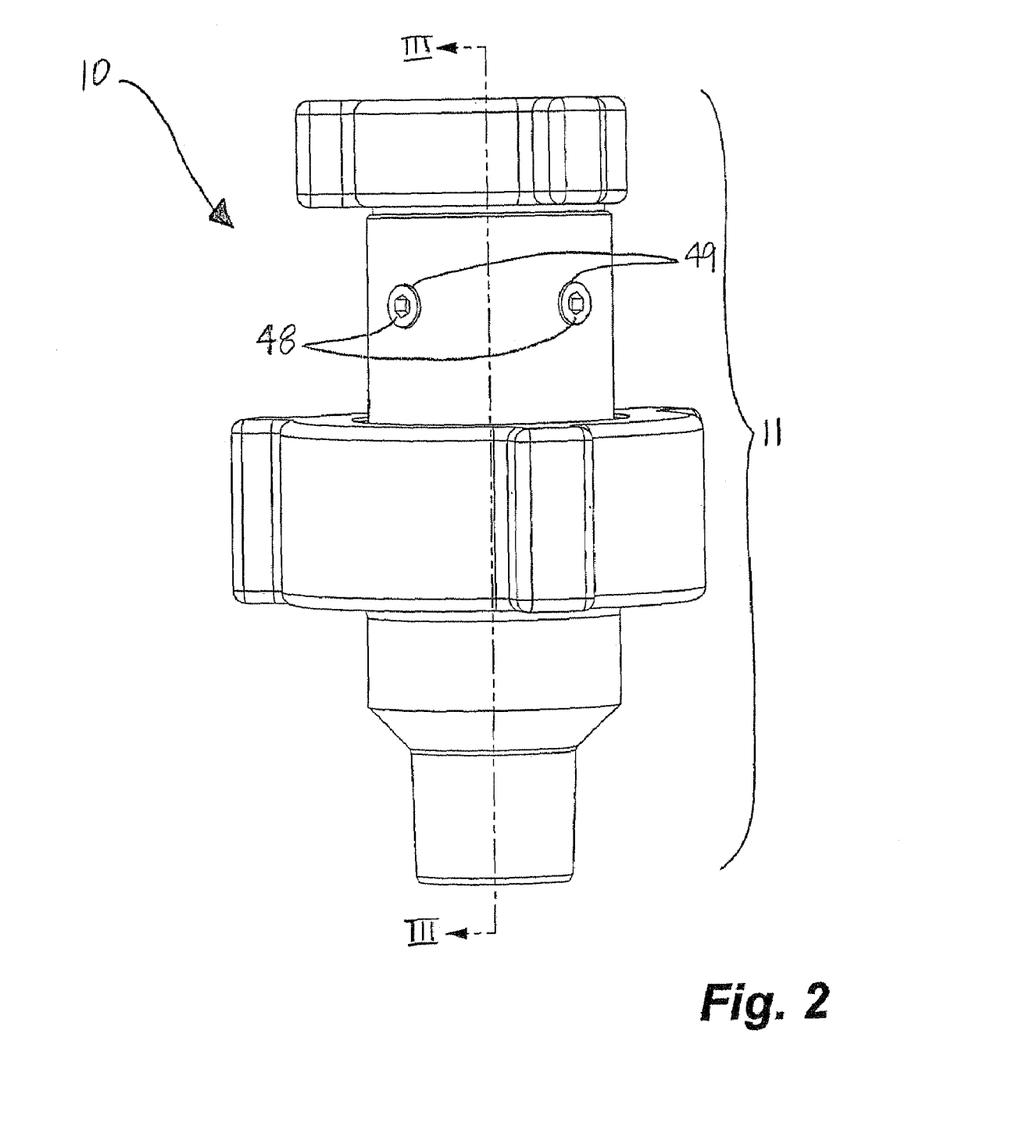
FIG. 2 is a side view of an outer housing of an embodiment of a self-aligning stuffing box, the stuffing box having a relatively low profile.
Figure 3:
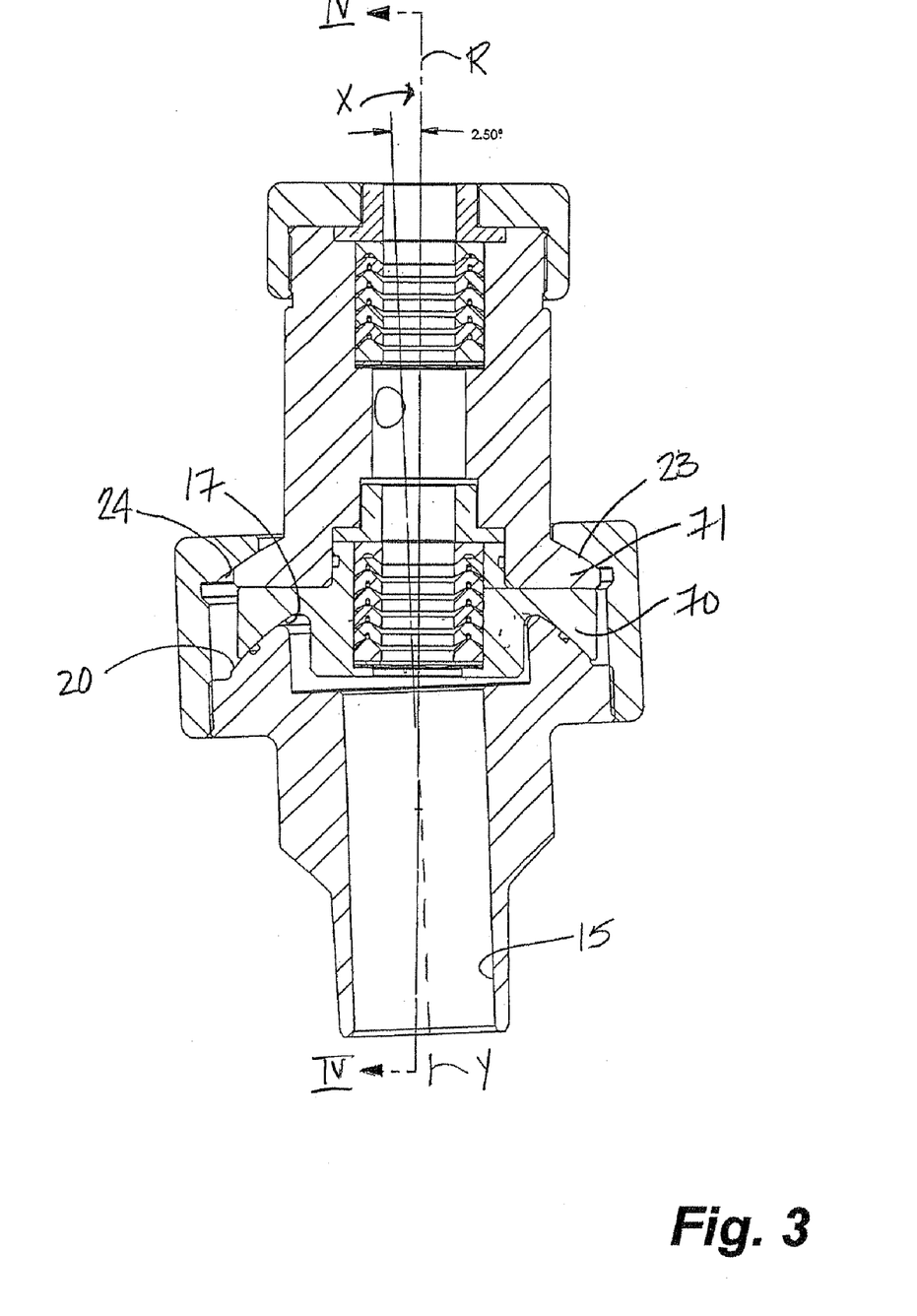
FIG. 3 is a longitudinal cross-sectional view along section lines III-III according to FIG. 2, illustrating mating spherical alignment surfaces misaligned for accommodating a 2.5° deviation of a rod axis relative to an aligned axis of the tubular housing and positioning of sealing means within the housing.
Figure 4:
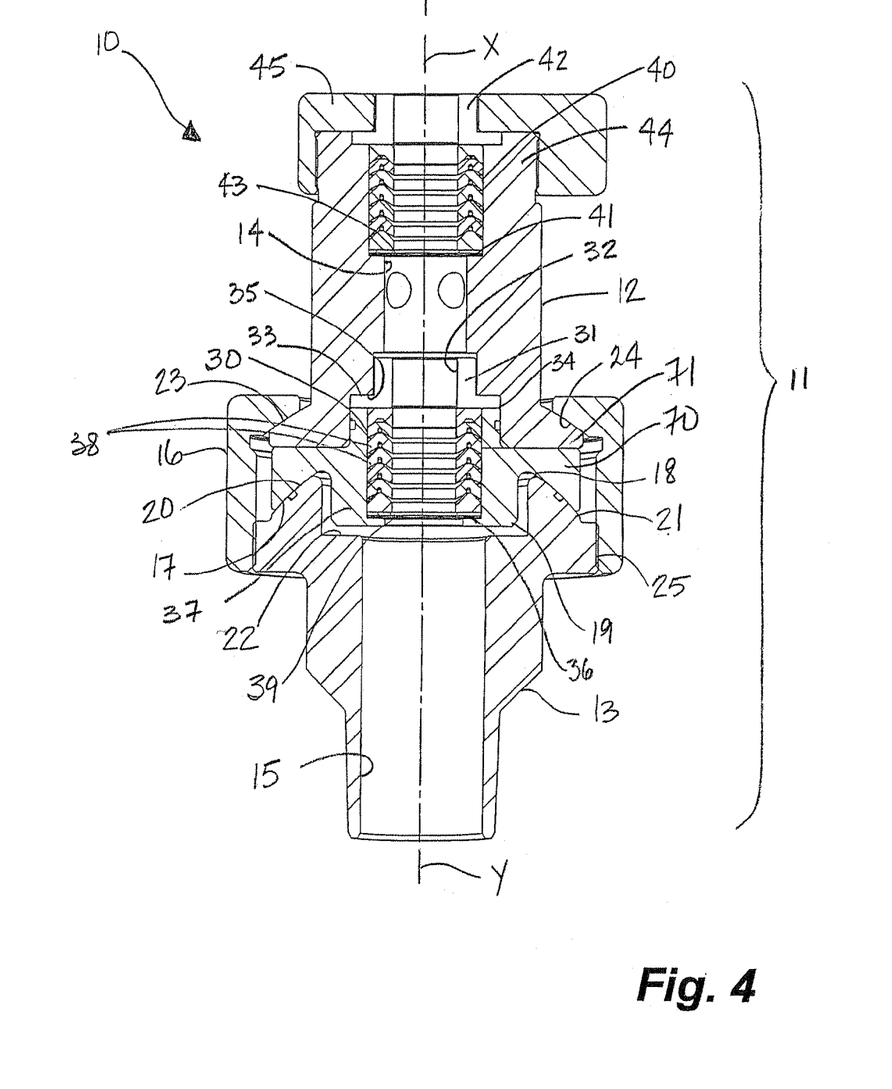
FIG. 4 is a longitudinal cross-sectional view along section lines IV-IV according to FIG. 3 illustrating alignment of the spherical alignment surfaces for accommodating the rod axis along the aligned axis of the tubular housing.
Figure 5:
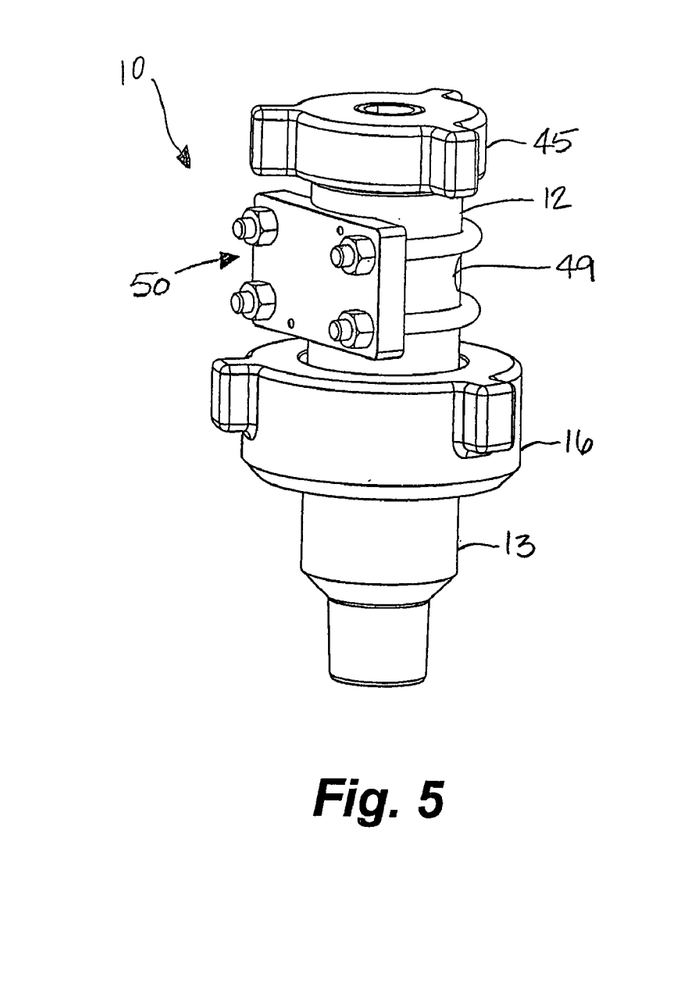
FIG. 5 is a side perspective view of an alternate embodiment of the stuffing box of FIG. 2, illustrating mounting means for a valve positioned in the tubular housing.
Figure 6:
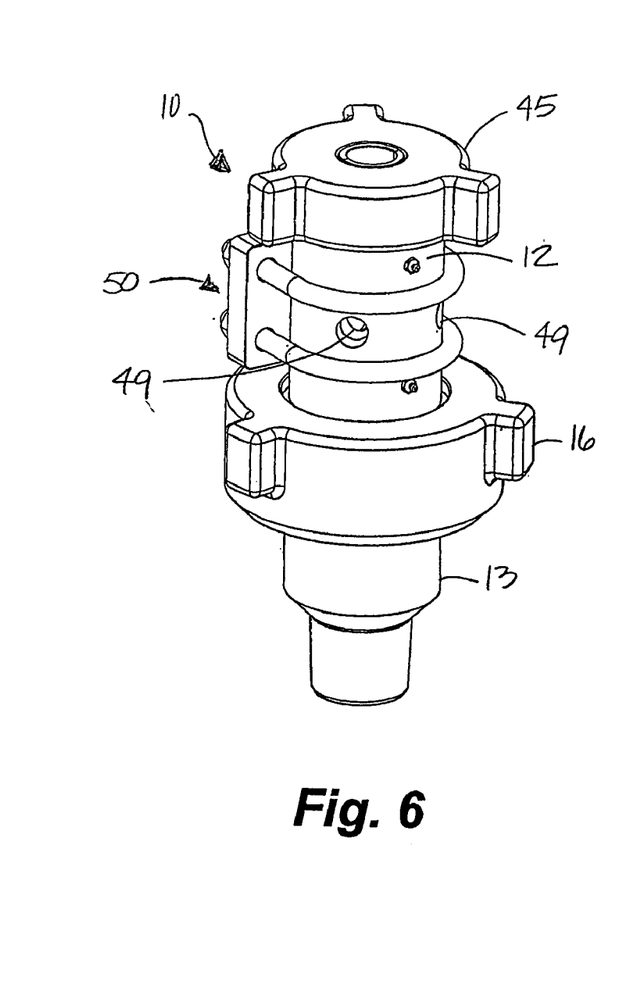
FIG. 6 is a rotated side perspective view according to FIG. 5.

As shown in FIGS. 2-4, a low profile stuffing box 10 comprises a housing 11 for connection to a wellhead (not shown). The housing 11 comprises and upper tubular housing 12 and a lower tubular housing 13, each of the upper and lower tubular housings 12, 13 having bores 14, 15 formed therein. A lower end 17 of the upper tubular housing 12 is coupled to an upper end 21 of the lower tubular housing 13. The upper housing bore 14 has a first axis X and the lower housing bore 15 has a second axis Y. When the upper and lower housings 12, 13 are aligned, the first and second axis X, Y form a common axis.

Between the upper tubular housing 12 and the lower tubular housing 13 is a spherical joint in order to permit misalignment of the upper housing 12 and first axis X relative to the lower housing 13 and second axis Y for accommodating a misaligned rod (not shown) to pass therethrough without laterally loading the stuffing box 1. A lower end of the upper housing 12 has a lower concave spherical surface 17 formed in an upwardly recessed, substantially concave circumferential groove 18 formed in the upper housing 12. The groove 18 defines a central downwardly depending cylindrical portion 19 about the bore 14.

The lower housing 13 has an upwardly extending substantially convex spherical surface 20 formed at an upper end 21, the lower concave spherical surface 17 of the upper housing 12 and the convex spherical surface 20 of the lower housing 13 are compatible surfaces. The convex spherical surface 20 has a central recess 22 formed therein for accepting the downwardly depending central portion 19 of the upper tubular housing 12 and permitting engagement of the compatible concave and convex spherical surfaces 17, 20. Once engaged, the upper housing 12 is capable of limited universal movement relative to the lower tubular housing 13, the spherical surfaces 17, 20 permitting the limited universal movement therebetween.

A connector portion 16 engagingly retains the upper housing 12 to the lower housing 13 at second corresponding spherical sliding surfaces 23, 24 to accommodate the universe movement of the upper housing 12 relative to the lower housing 13. Preferably, the connector portion 16, such as a hammer nut, is threadedly connected to an outer extent 25 of the lower housing 13 and positions the spherical sliding surfaces 23,24 adjacent one another for movement therebetween.

Figure 9:
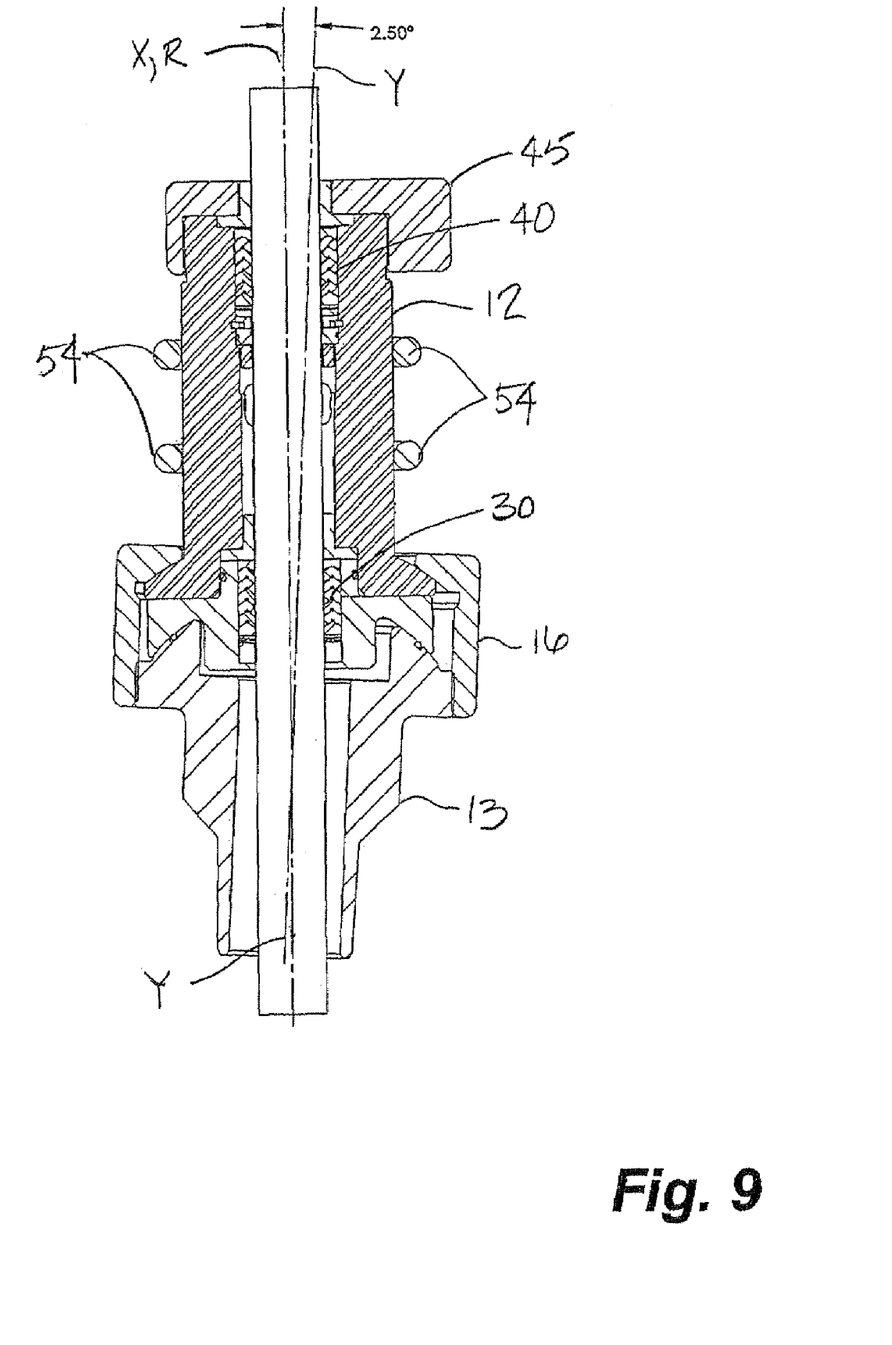
FIG. 9 is a longitudinal sectional view along section lines IX-IX according to FIG. 8 illustrating misalignment of the spherical alignment surfaces for accommodating a 2.5° deviation of a rod axis relative to an aligned axis of the tubular housing.
Figure 10:
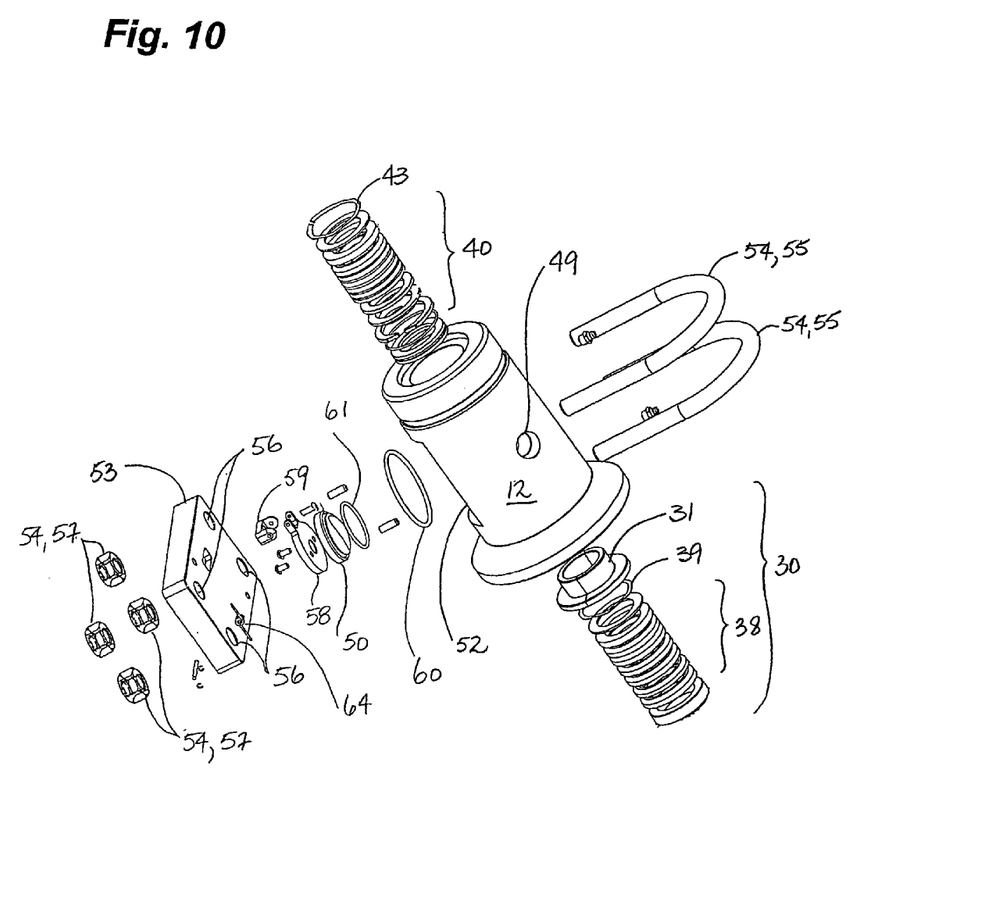
FIG. 10 is an exploded view of a mounting apparatus according to FIGS. 5 and 6 for mounting a valve in the bore of the tubular housing.

Preferably, the bore 15 of the lower tubular housing 13 is larger in diameter than the bore 14 of the upper tubular housing 12. The lower tubular housing 13 is fixed to the wellhead (FIG. 9) and thus, the larger bore 15 permits accommodation of deviation of the rod (not shown) therein while, at the same time, the upper tubular housing 12 moves at the engaged spherical surfaces 17,20, misaligning the first axis X relative to the second axis Y to align the first axis X to a rod axis R (FIGS. 4 and 9). Typically, a maximum deviation of the rod would be about 2.5°.

Having reference again to FIGS. 3 and 4, at least a first sealing means 30 is housed within the bore 14 of the upper tubular housing 12. The first sealing means 30 is housed in the downwardly depending central portion 19 of the upper housing 12. In a preferred embodiment therefore, the first sealing means 30 is effectively seated at or below the spherical alignment surfaces 17, 20 which permits the upper housing 12 to have a lower profile than conventional prior art stuffing boxes.

The first sealing means 30 is retained in the upper housing's bore 14 by a first retainer 31. The first tubular retainer 31 has a bore 32 and preferably a tab 33 formed about a lower edge 34 which engages a profiled recess 35 formed in the upper housing's bore 14 for engaging the first retainer 31 therein. The profiled recess 35 prevents upward movement of the first retainer 31 within the bore 14. A first shoulder 36 is formed at a lower end 37 of the upper housing's bore 14. The first sealing means is retained between the first retainer 31 and the first shoulder 36.

Preferably, the first sealing means 30 is a plurality of stacked circumferential seals 38, the seals 38 preferably being chevron seals. A biasing means 39, preferably a wave spring, is housed in the bore 14 between the first retainer 31 and the first shoulder 36 for energizing the seals 38 to engage a rod passing therethrough. The biasing means 39 may be positioned above or below the seals 38 and acts to compress the seals 38 between the first retainer 31 and the first shoulder 36 forcing them laterally outward into engagement with the rod.

A second sealing means 40 is housed in the upper tubular housing's bore 14, above the first sealing means 30. A second shoulder 41, a second retainer 42 and a second biasing means 43 act to retain and energize the second sealing means 40 in the bore 14 as described above. In a preferred embodiment, the second sealing means 40 is housed at a top end 44 of the upper tubular housing 12. Preferably, a profiled top cap 45 or hammer nut threadedly engages the upper tubular housing's top end 44 for retaining the second retainer 42 and sealing means 40 therein.

Having reference to FIGS. 5-11b and in another embodiment of the invention, the second sealing means 40 is spaced sufficiently above the first sealing means 30 to permit pivotally mounting a valve 50, such as a flapper valve, therebetween in the bore 14 of the upper tubular housing 12. Note that ports 49 are typically fitted with plugs 48 (FIGS. 2-5) or instrument lines (not shown). In a first position (FIG. 11a), the valve 50 permits passage of the rod 51 through the upper tubular housing's bore 14. In the absence of the rod 51, such as through catastrophic failure of the rod 51, the valve 50 is biased to a second position (FIG. 11b) wherein the valve 50 seals the bore 14 of the upper tubular housing 12. In this embodiment, a height of the upper tubular housing 12 is only increased by about 2 inches to accommodate mounting of the valve 50.

Figure 8:
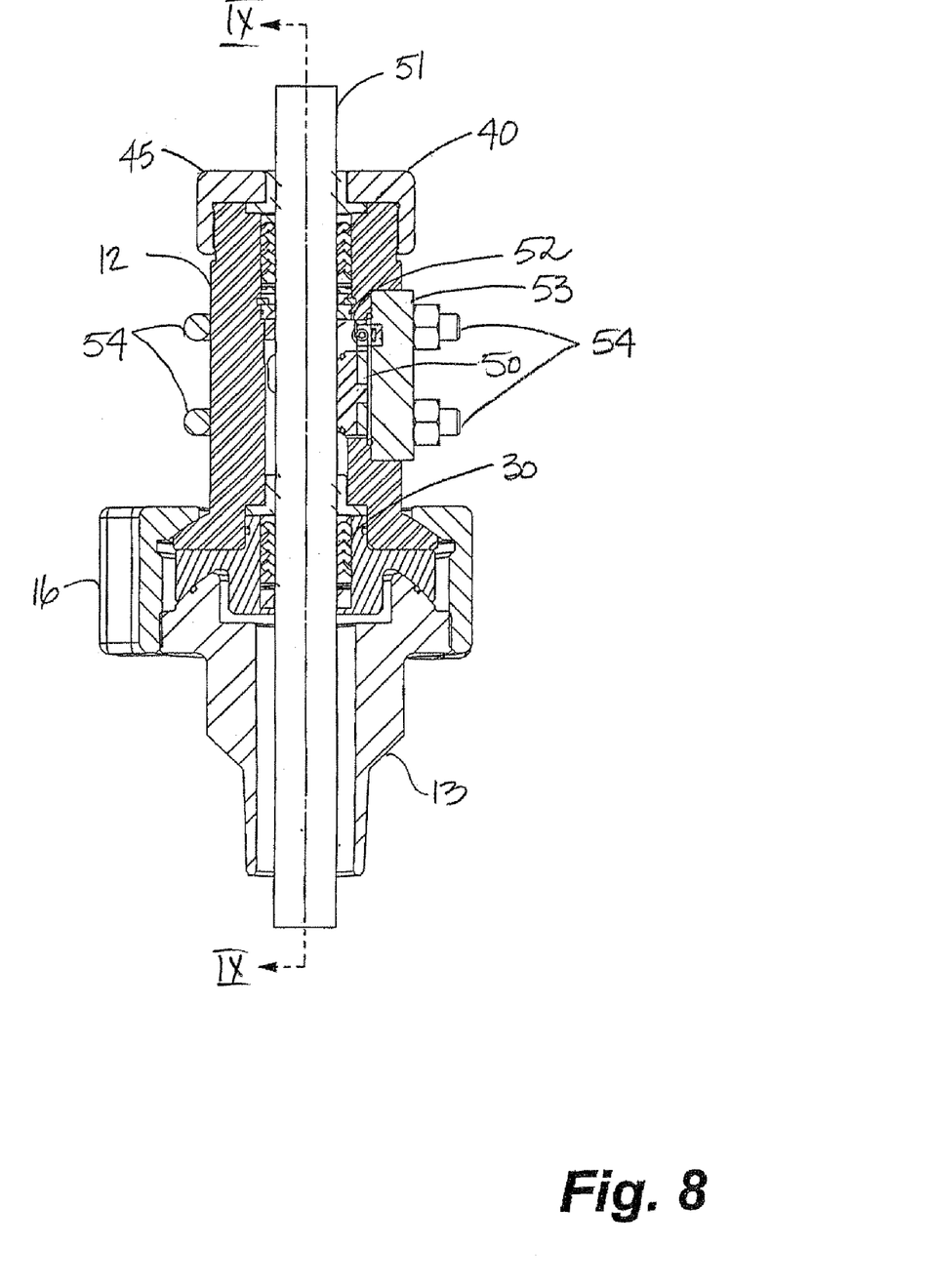
FIG. 8 is a side longitudinal cross-sectional view along section lines VIII-VIII according to FIG. 7, illustrating aligned spherical alignment surfaces and positioning of a flapper valve between the sealing means.

As shown in FIG. 8, a mounting port 52 is formed in the upper tubular housing 12 between the first and second sealing means 30,40. The port 52 extends through a side wall of the upper housing 12 for positioning the valve 50 in the bore 14. A mounting plate 53, to which the valve 50 is pivotally mounted, is positioned in the mounting port 52 and fastened therein using fasteners 54. As shown in a rotated view in FIG. 9, misalignment of the upper housing 12 relative to the lower housing 13 aligns the first axis X to the rod axis R as described above. The valve 50, mounted in the upper housing bore 14, remains operational regardless the misalignment, the first axis X being aligned with the rod axis R.

Figure 7:
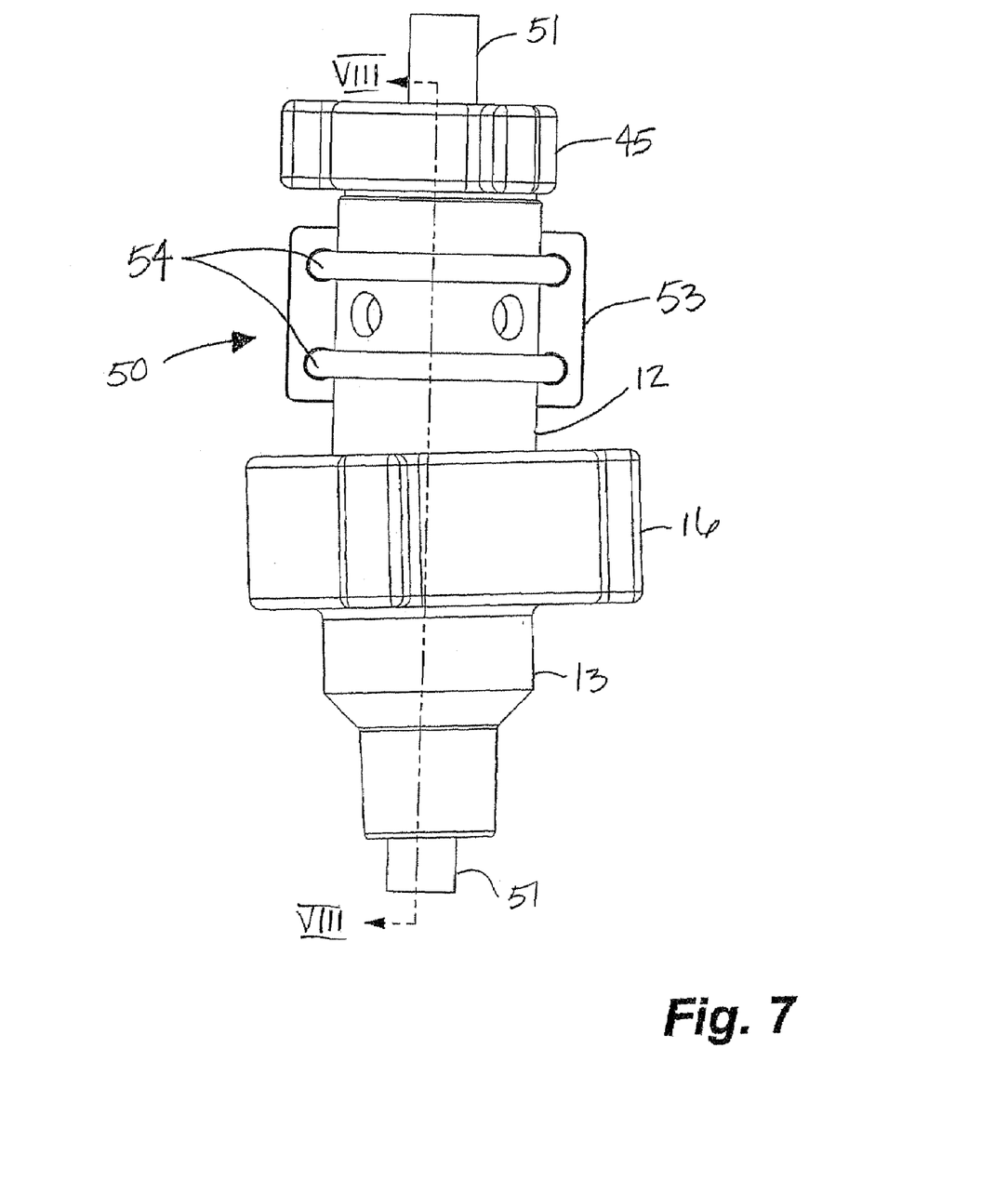
FIG. 7 is a front view of the embodiment according to FIGS. 5 and 6, an upper portion of the tubular housing rotated relative to a lower portion of the tubular housing for accommodating a rod therethrough.

Preferably, as shown in FIG. 7, the mounting plate 53 extends laterally from the mounting port 52 to facilitate fastening of the mounting plate 53 to the upper tubular housing 12. Best seen in FIG. 10, the fasteners 54 preferably comprise at least two U-bolts 55 which extend around the upper tubular housing 12 for engaging the mounting plate 53. The U-bolts are passed through bolt holes 56 formed in the portion of the mounting plate 53 which extends laterally from the mounting port 52 and is fastened thereto by nuts 57 threaded thereon.

The flapper valve 50 is mounted to a hinge plate 58 which is pivotally mounted to the mounting plate 53 using a hinge block 59. A seal 60, such as an O-ring, seals between the mounting plate 53 and the upper tubular housing 12. Best seen in FIG. 11b, in the second position a seal 61 such as an O-ring positioned about the valve 50, seals the valve 50 to an upper spherical seat 62 formed at the lower end 63 of the downwardly depending central portion 19 of the upper tubular housing 12 for sealing the upper housing bore 14.

Figure 11A:
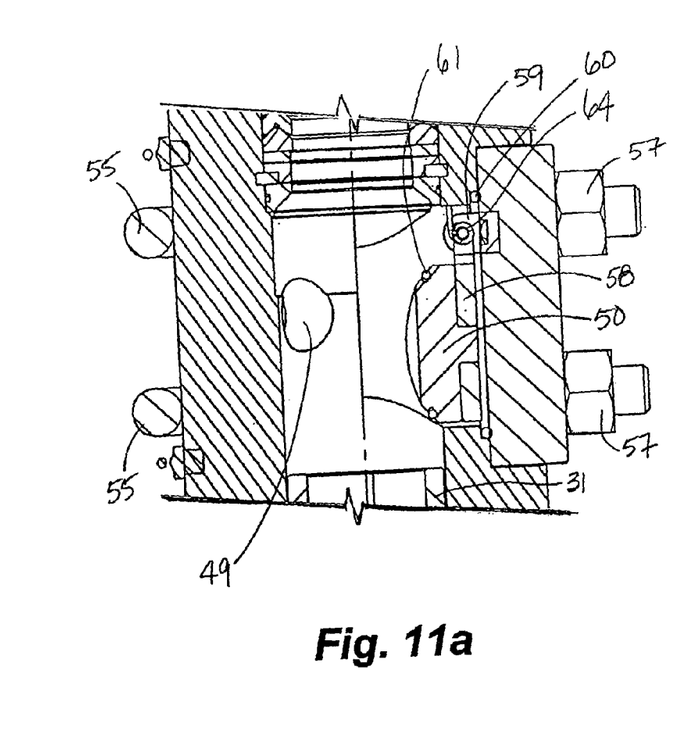
FIG. 11a is a sectional view of an upper tubular housing having a valve in a first position for passing a rod thereby.
Figure 11B:
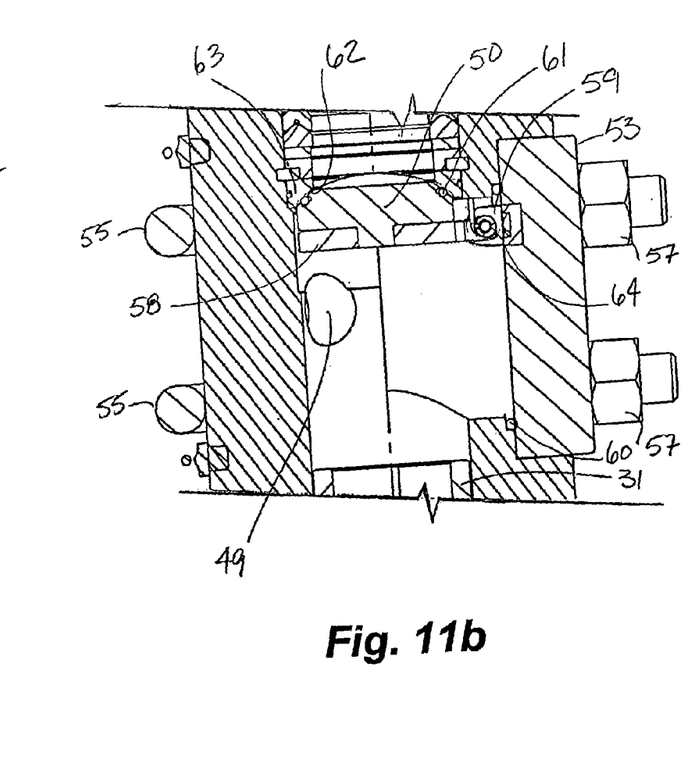
FIG. 11b is a sectional view of the upper tubular housing having the valve biased outwardly to a second position for sealing a bore therein.

The valve 50 is normally biased to the second position, such as by a clip spring 64. Thus mounted, the valve 50 is readily accessible by removing the U-bolts 55 and mounting plate 53 without need to disassemble the stuffing box, the sealing means 30, 34 or other wellhead assemblies.

What is claimed is:

1. A self-aligning stuffing box for a rod comprising:
   an upper tubular housing having a bore formed therethrough adapted for accepting the rod passing therethough along an axis, the bore having a first axis;
   a lower tubular housing having a bore formed therethrough adapted for accepting the rod passing therethrough, the bore having a second axis;
   a spherical joint between the upper tubular housing and the lower tubular housing having
   an upwardly recessed, substantially concave circumferential groove, having an outer spherical surface, formed about a lower end of the upper tubular housing and defining a central, downwardly depending portion therein; and
   an upwardly extending substantially convex spherical surface formed at an upper end of the lower tubular housing having a central recess formed therein for accepting the downwardly depending central portion of the upper tubular housing and permitting retained engagement of the concave and convex spherical surfaces for sealed universal movement therebetween for misaligning the first axis from the second axis and adapted for aligning the first axis relative to the rod axis; and
   at least a first sealing means housed within the bore of the downwardly depending central portion of the upper tubular housing, comprising:
   (i) a plurality of stacked circumferential seals adapted for sealing about the rod;
   (ii) a first retainer positioned in the bore for retaining the stacked circumferential seals against a first shoulder; and
   (iii) biasing means positioned in the bore for compressing the stacked seals between the first retainer and the first shoulder.

2. The self-aligning stuffing box as described in claim 1 wherein the stacked circumferential seals of the first sealing means are chevron seals.

3. The self-aligning stuffing box as described in claim 1 wherein the biasing means of the first sealing means is a wave spring.

4. The self-aligning stuffing box as described in claim 1 further comprising at least a second sealing means housed in the bore of the upper tubular housing above the at least a first sealing means.

5. The self-aligning stuffing box as described in claim 4 wherein the bore of the upper tubular housing further comprises a second shoulder formed therein and wherein the at least a second sealing means further comprises:
   a plurality of stacked circumferential seals for sealing about the rod;
   a second retainer positioned in the bore for retaining the stacked circumferential seals against the second shoulder; and
   biasing means positioned in the bore for compressing the stacked seals between the second retainer and the second shoulder.

6. The self-aligning stuffing box as described in claim 5 wherein the stacked circumferential seals of the at least a second sealing means are chevron seals.

7. The self-aligning stuffing box as described in claim 5 wherein the biasing means of the at least a second sealing means is a wave spring.

8. The self-aligning stuffing box as described in claim 4 further comprising a valve pivotally mounted within the bore of the upper tubular housing between the first and second sealing means, the valve adapted in a first position to permit passage of the rod through the bore of the upper tubular housing and, in the absence of the rod, to pivot to a second position for sealing the bore of the upper tubular housing.

9. The self-aligning stuffing box as described in claim 8 wherein the pivotal mounting further comprises:
   a plate for pivotally mounting the valve thereon;
   a mounting port extending through the upper tubular housing for mounting the plate therein and positioning the valve in the upper tubular housing bore; and
   fasteners for retaining the plate in the mounting port.

10. The self-aligning stuffing box as described in claim 9 wherein the plate extends laterally beyond the mounting port and the fasteners comprise:
    at least two U-bolts extending about the upper tubular housing for bolting to the portions of the plate extending beyond the mounting port.

11. The self-aligning stuffing box as described in claim 8 wherein the valve is a flapper valve.

12. The self-aligning stuffing box as described in claim 1 wherein the bore of the lower tubular housing is larger than the bore of the upper tubular housing and the upper tubular housing is capable of misalignment at the engaged spherical surfaces adapted for accommodating misalignment of the rod therebetween.

13. A self-aligning stuffing box for a rod comprising:
    an upper tubular housing having a bore formed therethrough adapted for accepting the rod passing therethough along an axis, the bore having a first axis;
    a lower tubular housing having a bore formed therethrough adapted for accepting the rod passing therethrough, the bore having a second axis;
    a spherical joint between the upper tubular housing and the lower tubular housing having
    a upwardly extending, substantially concave circumferential groove, having an outer spherical surface, formed about a lower end of the upper tubular housing and defining a central, downwardly depending portion therein; and
    an upwardly extending substantially convex spherical surface formed at an upper end of the lower tubular housing having a central recess formed therein for accepting the downwardly depending central portion of the upper tubular housing and permitting engagement of the concave and convex spherical surfaces for sealed universal movement therebetween for misaligning the first axis from the second axis and adapted for aligning the first axis relative to the rod axis;
    a first sealing means housed within the bore of the downwardly depending central portion of the upper tubular housing adapted for sealing about the rod;
    a second sealing means adapted for sealing about the rod housed within the bore of the upper tubular housing above the first sealing means; and
    a valve pivotally mounted in the bore of the upper tubular housing between the first and second sealing means the valve adapted in a first position to permit passage of the rod through the bore of the upper tubular housing and, in the absence of the rod, to pivot to a second position for sealing the bore of the upper tubular housing;
    a plate for pivotally mounting the valve thereon;
    a mounting port extending through the upper tubular housing for mounting the plate therein and positioning the valve in the upper tubular housing bore; and
    fasteners for retaining the plate in the mounting port.

14. The self-aligning stuffing box as described in claim 13 wherein the plate extends laterally beyond the mounting port and the fasteners comprise:
    at least two U-bolts extending about the upper tubular housing for bolting to the portions of the plate extending beyond the mounting port.

15. The self-aligning stuffing box as described in claim 13 wherein the valve is a flapper valve.

16. The self-aligning stuffing box as described in claim 13 wherein the first and second sealing means further comprise:
    a plurality of stacked circumferential seals for sealing about the rod;
    a retainer positioned in the bore for retaining the stacked circumferential seals against a shoulder formed within the bore; and
    biasing means positioned in the bore for compressing the stacked seals between the retainer and the shoulder.

17. The self-aligning stuffing box as described in claim 16 wherein the stacked circumferential seals are chevron seals.

18. The self-aligning stuffing box as described in claim 16 wherein the biasing means is a wave spring.

19. The self-aligning stuffing box as described in claim 13 wherein the bore of the lower tubular housing is larger than the bore of the upper tubular housing and the upper tubular housing is capable of misalignment at the engaged spherical surfaces adapted for accommodating misalignment of the rod therebetween.

* * * * *